(12) United States Patent
Good et al.

(10) Patent No.: US 10,555,055 B2
(45) Date of Patent: Feb. 4, 2020

(54) PATCH PANELS FOR USE WITH FIBER OPTIC AND COPPER CABLES AND SUPPORT RACK FOR THE SAME

(71) Applicant: NEXANS, Courbevoie (FR)

(72) Inventors: Paul Michael Good, New Holland, PA (US); Rakesh Sambaraju, Downingtown, PA (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/858,136

(22) Filed: Dec. 29, 2017

(65) Prior Publication Data

US 2019/0208291 A1 Jul. 4, 2019

(51) Int. Cl.
| | |
|---|---|
| *G02B 6/44* | (2006.01) |
| *H04Q 1/14* | (2006.01) |
| *H04Q 1/02* | (2006.01) |
| *H02B 1/26* | (2006.01) |
| *H01R 13/659* | (2011.01) |
| *H01R 13/518* | (2006.01) |
| *H02B 1/20* | (2006.01) |

(52) U.S. Cl.
CPC ........... *H04Q 1/141* (2013.01); *G02B 6/4452* (2013.01); *H04Q 1/136* (2013.01); *G02B 6/4448* (2013.01); *G02B 6/4454* (2013.01); *G02B 6/4495* (2013.01); *H01R 13/518* (2013.01); *H01R 13/659* (2013.01); *H02B 1/202* (2013.01); *H02B 1/26* (2013.01); *H04Q 2201/02* (2013.01); *H04Q 2201/04* (2013.01)

(58) Field of Classification Search
CPC .......... H02B 1/26; H02B 1/202; H02B 1/305; H01R 13/518; H01R 13/659; G02B 6/4448; G02B 6/4452; G02B 6/4454; G02B 6/4495
USPC ................. 439/540.1, 719; 361/826; 248/49; 385/135
See application file for complete search history.

(56) References Cited

U.S. PATENT DOCUMENTS

| | | | | |
|---|---|---|---|---|
| 7,637,773 | B2 * | 12/2009 | Shifris ................ | H01R 9/2416 439/540.1 |
| 2008/0151524 | A1 * | 6/2008 | Kelly ................... | H04Q 1/064 361/826 |
| 2010/0054681 | A1 * | 3/2010 | Biribuze ............. | G02B 6/4452 385/135 |

* cited by examiner

*Primary Examiner* — Abdullah A Riyami
*Assistant Examiner* — Justin M Kratt
(74) *Attorney, Agent, or Firm* — Sofer & Haroun, LLP

(57) ABSTRACT

A rack and patch panel arrangement includes a rack having at least two mounting rails. The rack has a height width and depth. A patch panel is supported on a frame connected to the mounting rails. The patch panel, when mounted on the frame extends horizontally into the depth of the rack.

6 Claims, 8 Drawing Sheets

PATCH PANELS FOR USE WITH FIBER OPTIC AND COPPER CABLES AND SUPPORT RACK FOR THE SAME

FIELD OF THE INVENTION

The present arrangement relates to a rack for supporting passive patch panels used in fiber optic or copper data network cable connections. More particularly, the present arrangement relates to a patch panel and rack arrangement with increased connection capacity within a defined standardized space within the rack.

DESCRIPTION OF RELATED ART

In the communication industry a "rack" is a frame, cabinet or other structure that supports various interconnectivity components within a data network. One common interconnectivity component in a data communication network is a patch panel. These patch panels, arranged within the racks, are used to provide a connection structure with a plurality of connection ports (i.e. openings for receiving cable connectors) where fiber optic or copper cable segments of a communication pathway are connected. It is common to have an arrangement including one or more racks and patch panels within a data communication cable network to provide flexibility when arranging communication equipment, changing, upgrading or replacing equipment.

FIGS. 1A and 1B show a prior art rack 1000 for supporting one or more patch panels 1002 for use in high density data communication centers. Rack 1000 illustrated in FIGS. 1A and 1B, is an industry standard 19" rack meaning that it is 19" wide across the front between the two vertical mounting rails 1004. The width of 19" for rack 1000 and patch panels 1002 is based on the industry standard "IEC 60297-3-100 Part 3-100 through part 105" (incorporated herein by reference) to allow different patch panels to be easily installed, replaced, moved etc. . . . within a network between different racks.

Normally, 19" racks 1000 such as that shown in FIG. 1 are 42 U tall. "U" is the industry standard term (short for rack unit) that equals a dimension of 1.75 inches in vertical height. A 42 U rack would accommodate about 73.5 inches of functional height along rails 1004 to support patch panels 1002. Patch panels 1002 are typically sized at 1 U, 2 U or 4 U etc. . . . meaning that they span a certain number of rack units in vertical height along their front face.

FIG. 2 is a close up view of a standard 1 U patch panel 1002 (1.75" in vertical height) having forty eight (48) connector ports 1006 (or openings) for receiving copper LAN connectors (e.g. GG45 style copper connector). For the purposes of illustration patch panel 1002 includes connectivity ports 1006 dimensioned to support copper connectors. However it is understood that the salient features of the invention are equally applicable to patch panels with connection ports sized for fiber optic connectors.

Generally, in the industry of data communication networks, there is an ever increasing need for higher connection densities in both data centers and enterprise networks, for both copper and fiber optic connectivity. As noted above, the prior art patch panels 1002 are configured such that their width is typically 19" to match the 19" standard rail 1004 spacing on a typical support rack 1000. Moreover, the connection ports in patch panels 1002 also have size restrictions owing to the standardized dimensions of cable connectors. This results in an upper limit for the maximum number of connector ports 1006 that can fit into a patch panel (e.g. a 1 U patch panel having a standard 19" in width).

For example, patch panel 1002 of FIG. 2, configured with connector ports 1006 sized for copper data communication cable connectors has forty eight (48) connection ports 1006 across the front face, arranged in two parallel horizontal rows of twenty four (24). No additional connector ports 1006 fit within a patch panel having a 1 U height and 19" standardized rack width. In some cases, as shown in FIG. 3 an angled patch panel 1002A may be used which is likewise 1 U in height and 19" across (at its end connection points with the rails of the rack). This patch panel 1002A however has an angled face offering different connectivity and spacing options relative to a standard flat front patch panel. Never-the-less, such an angled patch panel still has only forty eight (48) total connection ports 1006 within 1 U.

OBJECTS AND SUMMARY

Although the front width and height of racks 1000 is standardized, the horizontal depth of racks 1000 may vary, typically between 24" and 48". In FIG. 1B, the horizontal depth of rack 1000 is 47.25", When making a cable connection between segments in a communication pathway through a patch panel 1002 supported in a rack 1000, one segment and its associated cable is attached to the front of patch panel 1002 and the other segment is attached to the back of patch panel 1002, at the same connection port.

The present arrangement provides a novel rack and patch panel that supports patch panels that extend into the horizontal depth of the racks rather than the typical spanning of the front facing horizontal width of the rack. This arrangement by better utilizing the horizontal depth of the rack allows for an increased number of connection ports per patch panel while still fitting within a given 19" rack width and 1 U height. Various arrangements and structures of patch panels and associated supports within the rack increase the maximum number of connection ports relative to prior art racks/panels within the same space and additionally provide more options for connection port geometry and associated handling of the cable segments within the rack.

BRIEF DESCRIPTION OF THE DRAWINGS

The present invention can be best understood through the following description and accompanying drawings, wherein.

DETAILED DESCRIPTION

Figures 4A, 4B:
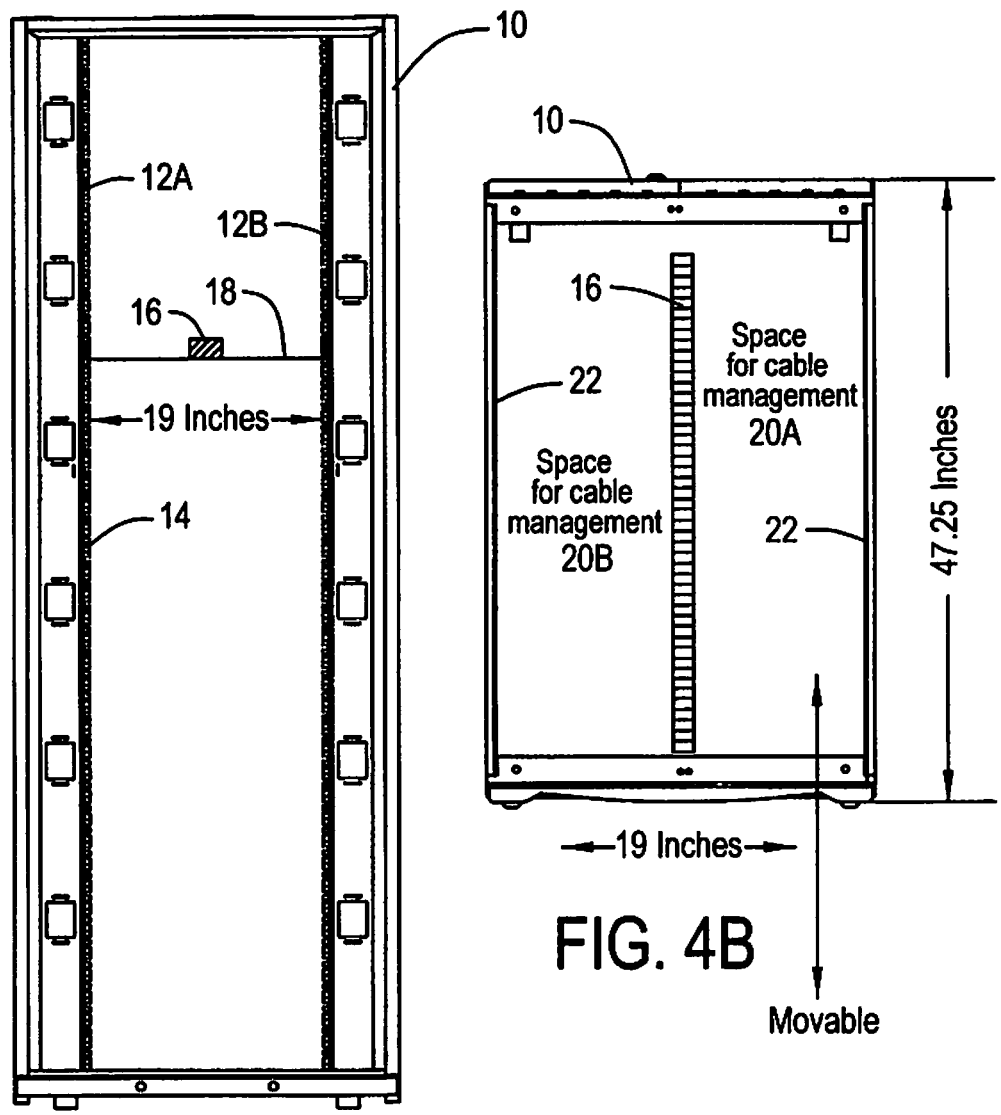
FIGS. 4A and 4B illustrate a rack and patch panel arrangement in accordance with one embodiment of the invention.

In one embodiment of the present invention, as shown in FIGS. 4A and 4B, a cable management rack 10 is provided.

Rack 10 is constructed as a rectangular cabinet with an open front face (and possibly open rear face) with two removable side walls 22 screwed onto either side. Along the front face of rack 10, two vertical mounting rails 12A and 12B are spaced apart along the two front edges of rack 10 at the industry standard of 19″. Optionally, rack 10 may also have mounting rails along the two vertical edges of the rear face (not shown). Rails 12A and 12B have screw holes 14 along their entire vertical height to support various connections thereto.

Arranged within rack 10 is a patch panel 16 supported on a frame 18 that is connected to rails 12A and 12B on either side via screw holes 14. Frame 18 that supports patch panel 16 on rails 12A and 12B may be in the form of flat support surface that extends into the horizontal depth of rack 10, may be an open framework of connected support beams, or may otherwise a support structure that can both support patch panel 16 and be connected to rack 10 by being screwed into screw holes such as screw holes 14 on rails 12A and 12B.

In one embodiment, frame 18 may be structured as a static support frame that holds patch panel 16 in a fixed position or it may be of a movable drawer design allowing patch panel 16 to be pulled in and out of rack 10. In the case of a fixed position frame 18, side walls 22 of rack 10 may be removable to allow for cable management when making connections in patch panel 16.

Patch panel 16 as shown in FIGS. 4A and 4B is dimensioned to fit within 1 U space of vertical height within rack 10. It is noted that for exemplary purposes, patch panel 16 is shown as 1 U, but the salient features of the invention may be employed with patch panels of other heights (e.g. 2 U, 4 U etc. . . . ).

Figures 1A, 1B:
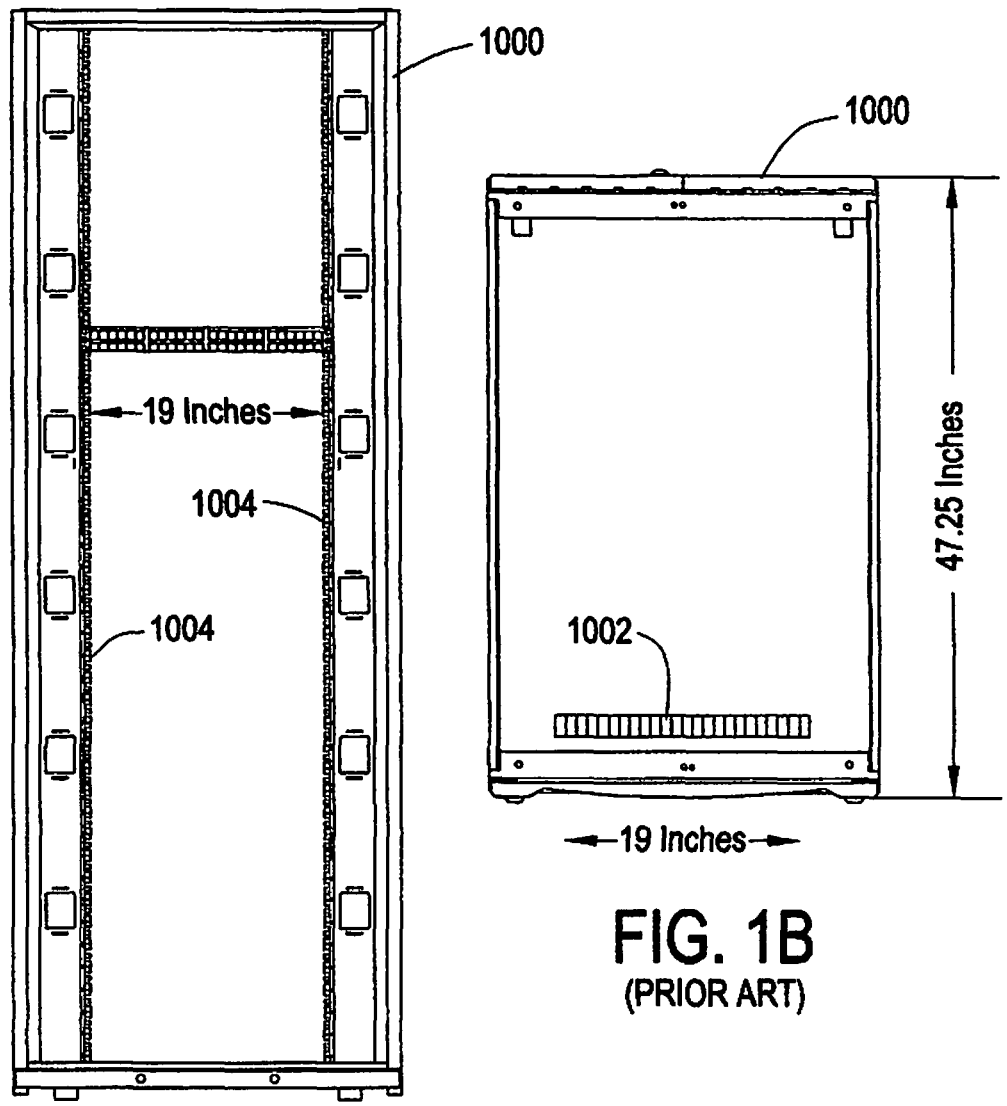
FIGS. 1A and 1B show prior art rack and patch panels.
Figure 2:
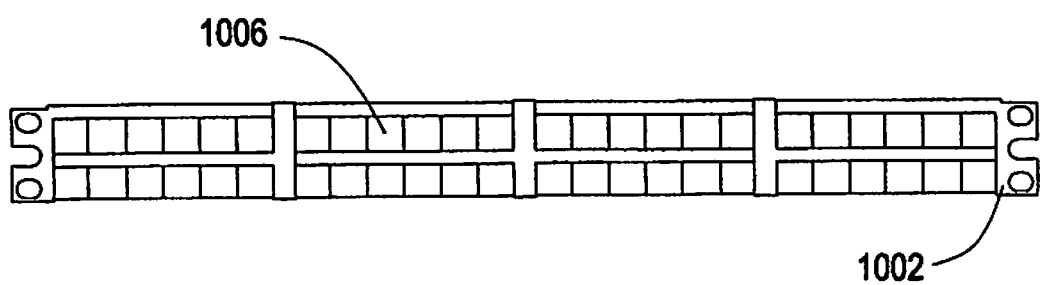
FIG. 2 shows a prior art patch panel.
Figure 3:
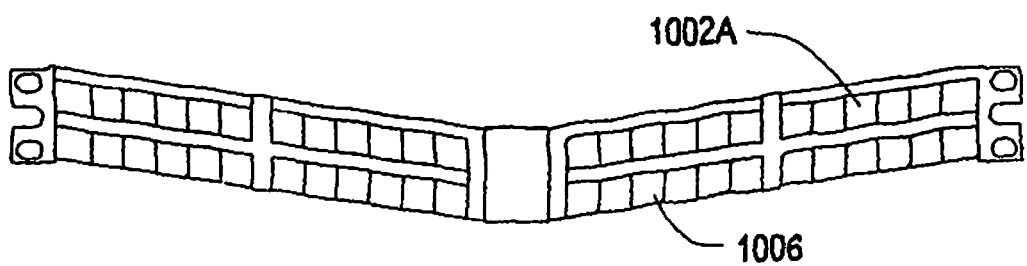
FIG. 3 shows another prior art patch panel.

In the present example patch panel 16 is for copper connectors and is 1 U in height. A typical 1 U prior art patch panel for copper connectors in a data communication cable has two horizontal rows of 24 connector ports (total 48) as shown for example in prior art FIG. 2.

In accordance with one embodiment of the present invention, as shown in FIG. 4B, rack 10 has a horizontal depth of 47.25″ and as such patch panel 16 has 96 total connector ports (each box in FIG. 4B which is an overhead view represents 2 vertically aligned connector ports of 1 U patch panel for convenience of illustration). Owing to the use of the horizontal depth of rack 10 which is much greater than the standardized 19″, a 1 U patch panel 16 can have double the amount of connections ports.

Within the horizontal depth of rack 10, cable management spaces 20A and 20B are located on either side of patch panel 16. These areas allow for cable and bundling and management for cable segments entering from either side of panel 16.

Figures 5A, 5B:
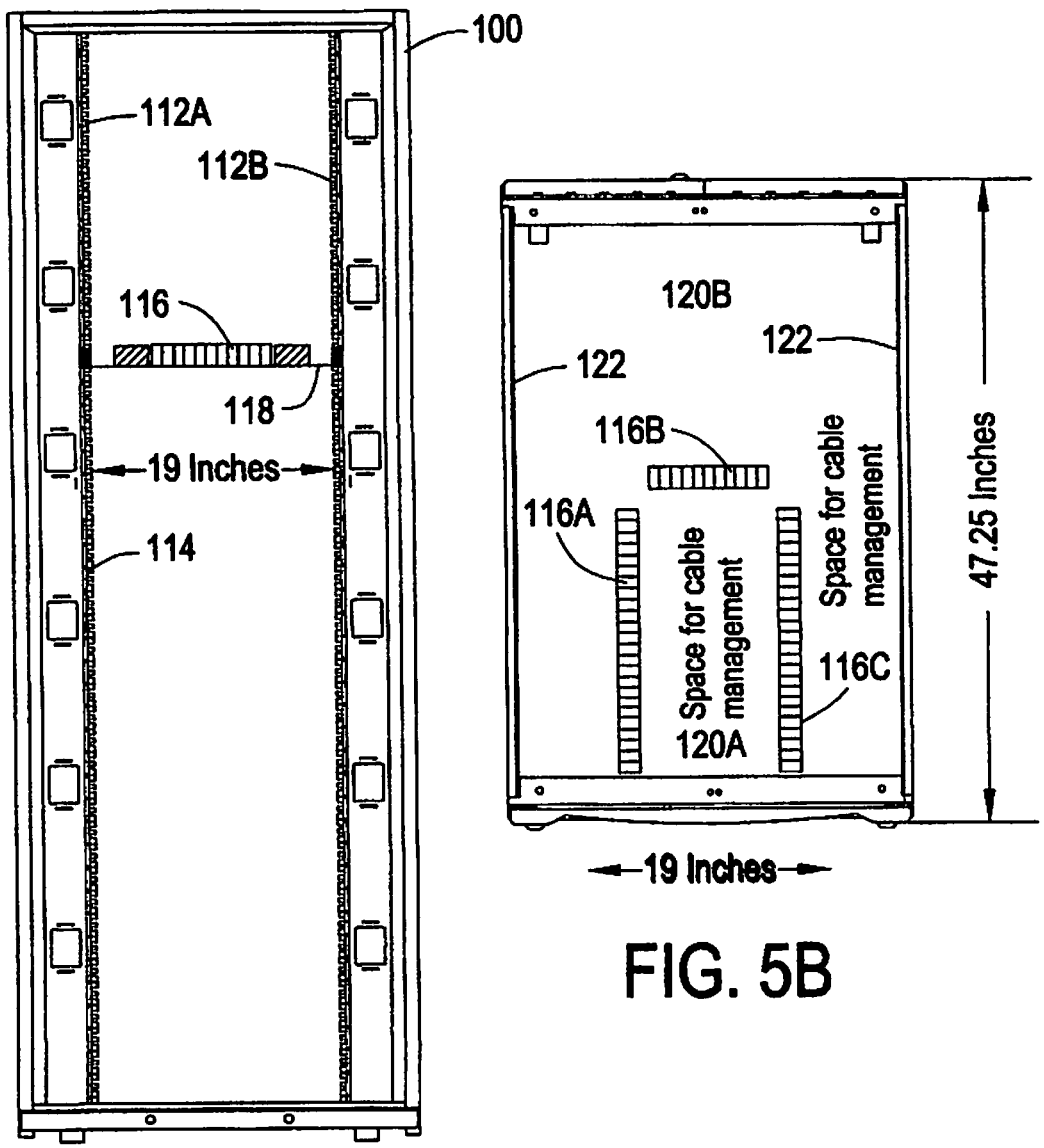
FIGS. 5A and 5B illustrate a rack and patch panel arrangement in accordance with another embodiment of the invention.

In another embodiment of the present invention, FIGS. 5A and 5B show a different arrangement and shape for the patch panel. In this embodiment rack 100 maintains rails 112A and 112B, screw holes 114, a segmented patch panel 116a, 116b and 116c, support frame 118, cable management space 120A and 120B, and rack side walls 122. Each of patch panel segments 116a, 116b and 116c is supported on frame 118 which may be in the form of a flat metal sheet, metal lattice, etc. . . . screwed into rails 112A and 112B.

Each of these components has essentially the same function as described above in connection with FIGS. 4A and 4B. However, segmented patch panel 116a, 116b, and 116c define an inverted "U" shape. Again the number of connection ports (ninety-six (96) in this example) per U space is greatly increased relative to the prior art patch panels utilizing the 47.25″ horizontal depth of rack 110.

Such an arrangement as shown in FIGS. 5A and 5B offer a different shape for cable management areas 120A and 120B to allow flexibility to a network design engineer depending on the various space requirements for cable segments entering either side of panel 116.

Figures 6A, 6B:
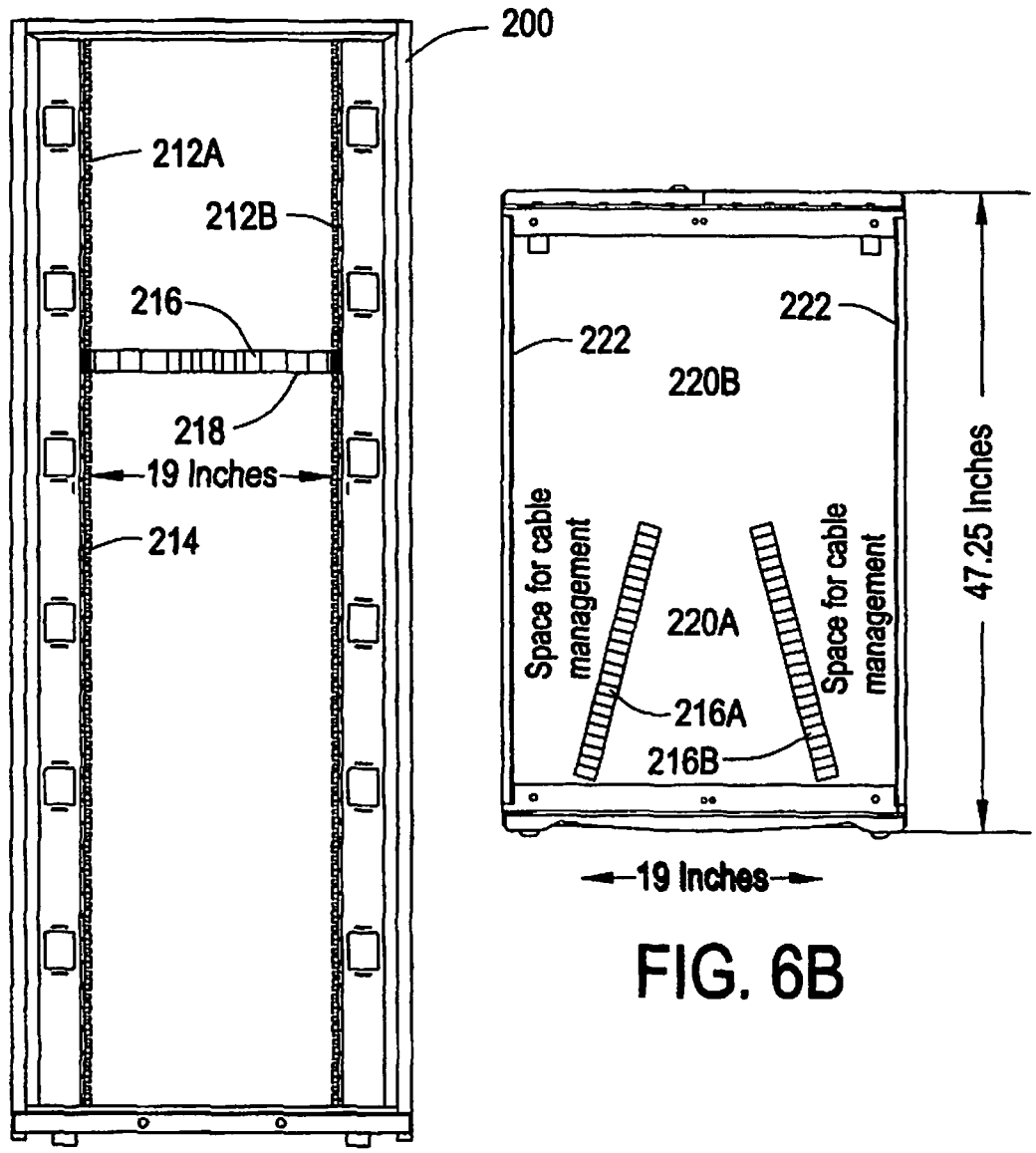
FIGS. 6A and 6B illustrate a rack and patch panel arrangement in accordance with yet another embodiment of the invention.

In another embodiment of the present invention, FIGS. 6A and 6B show a different arrangement and shape for the patch panel 216. In this embodiment rack 200 maintains rails 212A and 212B, screw holes 214, a segmented patch panel 216A, 216B and support frame 218, cable management space 220A and 220B and rack side walls 222. As in FIGS. 5A and 5B, each of patch panel segments 216a and 216b is supported on frame 218 which may be in the form of a flat metal sheet, metal lattice, etc. . . . screwed into rails 212A and 212B.

Each of these components has essentially the same function as described above in connection with FIGS. 4A and 4B. However, patch panel segments 216a and 216b together define an inverted "V" shape. This arrangement increases the available connection ports per U space to ninety-six (96).

Figures 7A, 7B:
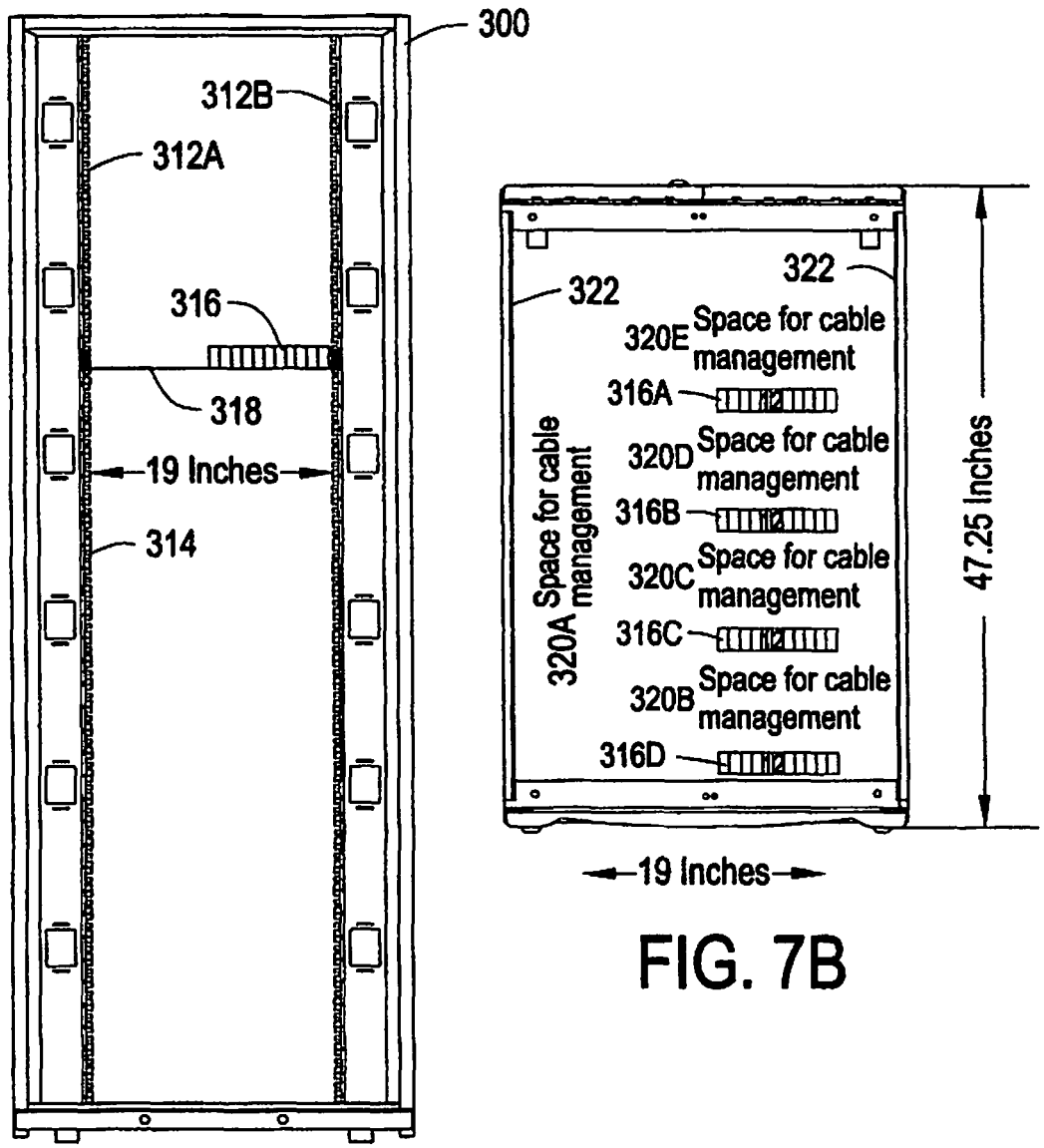
FIGS. 7A and 7B illustrate a rack and patch panel arrangement in accordance with yet another embodiment of the invention.

In another embodiment of the present invention, FIGS. 7A and 7B shows a different arrangement and shape for the patch panel 316. In this embodiment rack 300 maintains rails 312A and 312B, screw holes 314, a segmented patch panel 316a, 316b, 316c and 316d, support frame 318, cable management space 320A, 320B, 320C, 320D and 320E and rack side walls 322. Each of patch panel segments 316a-316d are supported on frame 318 which may be in the form of a flat metal sheet, metal lattice, etc. . . . screwed into rails 312A and 312B.

Each of these components has essentially the same function as described above in connection with FIGS. 4A and 4B. However, each of patch panel segments 316a-316d is spaced apart in parallel extending into the depth of rack 300. This arrangement increases the available connection ports per U space to ninety-six (96).

Figures 8A, 8B:
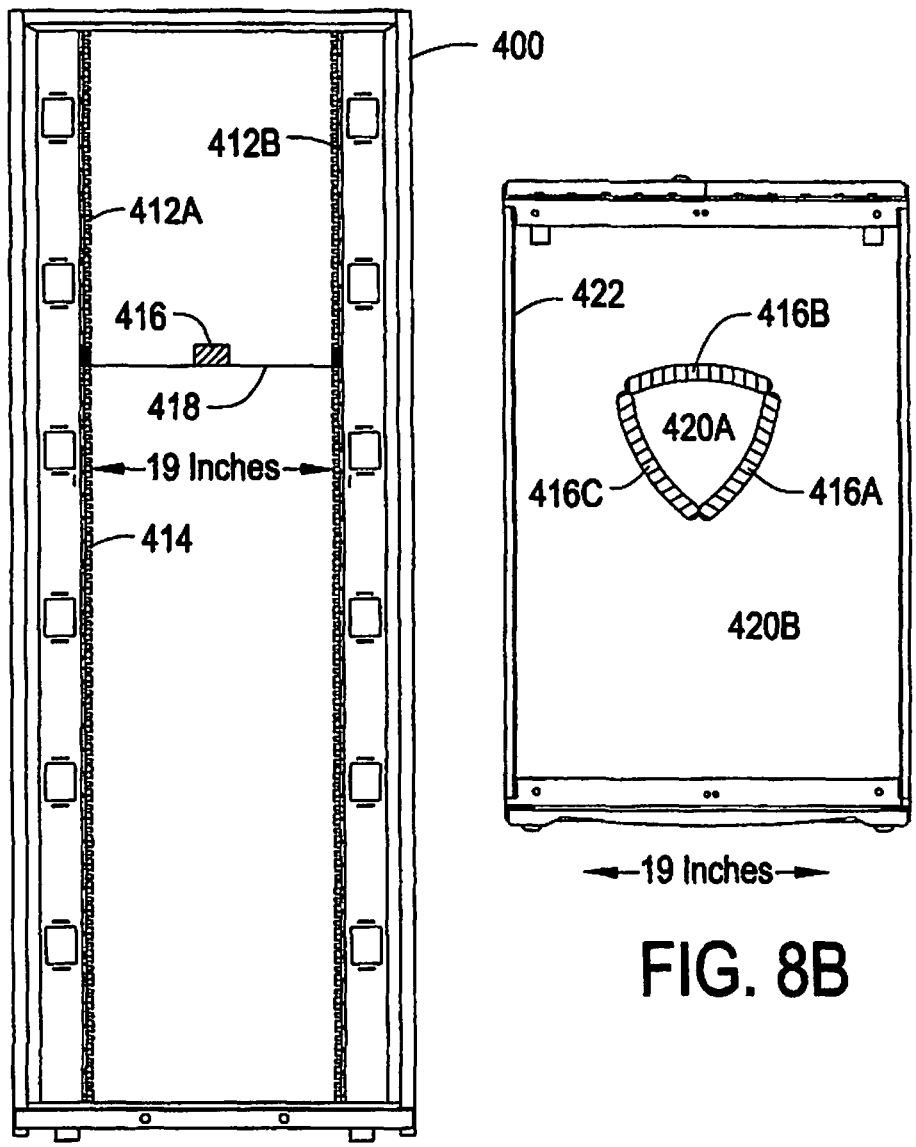
FIGS. 8A and 8B illustrate a rack and patch panel arrangement in accordance with yet another embodiment of the invention.

In another embodiment of the present invention, FIGS. 8A and 8B shows a different arrangement and shape for the patch panel 416. In this embodiment rack 400 maintains rails 412A and 412B, screw holes 414, a segmented patch panel 416a, 416b, and 416c, support frame 418, cable management space 420A and 420B and rack side walls 422. Each of patch panel segments 416a-416c are supported on frame 418 which may be in the form of a flat metal sheet, metal lattice, etc. . . . screwed into rails 412A and 412B.

Each of these components has essentially the same function as described above in connection with FIGS. 4A and 4B. However, patch panel segments 416a-416c are arranged in the shape of a triangle, such a Reuleaux triangle (outwardly curved triangle segments). This arrangement increases the available connection ports per U space to ninety-six (96).

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:
1. A rack and patch panel arrangement comprising:
a rack having at least two mounting rails, said rack having a height, width and depth; and
a patch panel supported on a frame connected to said mounting rails, said frame extending across said width of said rack and into the depth of said rack wherein said patch panel, when mounted on said frame, extends substantially perpendicular to a front face of said rack, and horizontally on said frame into the depth of said rack.

2. The rack and patch panel as claimed in claim 1, wherein said frame supporting said patch panel supports said patch panel in a fixed position.

3. The rack and patch panel as claimed in claim 1, wherein said frame supporting said patch panel supports said patch panel in a movable manner such that said patch panel may be pulled out of and pushed into said rack.

4. The rack and patch panel as claimed in claim 1, wherein said patch panel has a single row of connection ports extending horizontally into the depth of said rack.

5. The rack and patch panel as claimed in claim 1, wherein said patch panel has a plurality of segments extending into the horizontal depth of the rack.

6. The rack and patch panel as claimed in claim 5, wherein said patch panel has two segments arranged in an inverted "V" shape.

* * * * *